(12) United States Patent
Du Breuil

(10) Patent No.: US 9,032,442 B2
(45) Date of Patent: May 12, 2015

(54) ACQUIRING CABLE CHANNEL MAP INFORMATION IN A CABLE RECEIVER

(75) Inventor: Thomas L. Du Breuil, Ivyland, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 1384 days.

(21) Appl. No.: 12/346,952

(22) Filed: Dec. 31, 2008

(65) Prior Publication Data
US 2010/0169919 A1  Jul. 1, 2010

(51) Int. Cl.
*H04N 7/173* (2011.01)
*H04N 5/445* (2011.01)
*H04N 5/50* (2006.01)
*H04N 21/434* (2011.01)
*H04N 7/16* (2011.01)

(52) U.S. Cl.
CPC ............ *H04N 5/50* (2013.01); *H04N 21/4345* (2013.01)

(58) Field of Classification Search
USPC .................. 725/131, 47, 48, 56, 50; 348/732
See application file for complete search history.

(56) References Cited

U.S. PATENT DOCUMENTS

| 5,576,755 | A | | 11/1996 | Davis et al. |
| 5,666,645 | A | | 9/1997 | Thomas et al. |
| 5,973,683 | A | * | 10/1999 | Cragun et al. ............... 715/719 |
| 6,154,203 | A | | 11/2000 | Yuen et al. |
| 6,442,757 | B1 | * | 8/2002 | Hancock et al. ............. 725/50 |
| 6,583,825 | B1 | * | 6/2003 | Yuen et al. .................... 348/731 |
| 6,606,747 | B1 | | 8/2003 | Yuen et al. |
| 6,904,610 | B1 | * | 6/2005 | Bayrakeri et al. ............ 725/54 |
| 6,978,471 | B1 | | 12/2005 | Klopfenstein |
| 6,993,782 | B1 | | 1/2006 | Newberry et al. |
| 7,024,676 | B1 | | 4/2006 | Klopfenstein |
| 7,113,230 | B1 | * | 9/2006 | Genovese et al. ............. 348/731 |
| 7,380,263 | B2 | * | 5/2008 | Shintani ......................... 725/59 |
| 7,444,661 | B1 | | 10/2008 | Wugofski |
| 2007/0016932 | A1 | * | 1/2007 | Franken et al. ................ 725/51 |
| 2007/0061840 | A1 | * | 3/2007 | Walter et al. .................. 725/39 |
| 2007/0236612 | A1 | * | 10/2007 | Onomatsu .................... 348/731 |
| 2009/0204995 | A1 | * | 8/2009 | Kang et al. .................... 725/50 |
| 2009/0249396 | A1 | * | 10/2009 | Cheng et al. .................. 725/39 |
| 2009/0282439 | A1 | * | 11/2009 | Irwin et al. .................... 725/50 |
| 2010/0169920 | A1 | * | 7/2010 | Michel et al. ................. 725/39 |
| 2011/0171941 | A1 | * | 7/2011 | Cusick et al. ............. 455/414.1 |

OTHER PUBLICATIONS

Advanced Television System Committee, "ATSC Standard: Program and System Information Protocol for Terrestrial Broadcast and Cable (Revision B)," Doc A/65B, Mar. 18, 2003.
Society of Cable Telecommunications Engineers, Inc., ANSI/SCTE 65 2008, "Service Information Delivered Out-of-Band for Digital Cable Television," 2008.
M. Corl et al., "Implementing the NCTA-CEA PSIP Agreement," NCTA Cable 2002 Conference, New Orleans, Louisiana, May 5-8, 2002.
Wikipedia.org, "Digital Cable," retrieved Aug. 16, 2012 from en.wikipedia.org/w/index.php?title=Digital_cable&oldid=253963655, dated Nov. 25, 2008.

* cited by examiner

*Primary Examiner* — Pankaj Kumar
*Assistant Examiner* — Reuben M Brown
(74) *Attorney, Agent, or Firm* — Stewart M. Wiener

(57) ABSTRACT

The present invention is a method, system, and computer-readable medium for acquiring a channel map in a cable receiver. The channel map associates physical analog and digital channels in an RF spectrum to channel identification data, where the channel identification data includes physical RF channel numbers, modulation type, virtual channels, and channel names. The method obtains a list of available channels from an electronic program guide service provider, and initializes the channel map based on the list of available channels. The method performs a channel scan to detect clear channels, and collect identification information for each detected clear channel. Based on the identification information, the method updates the channel map for each detected channel. The method receives changes to the channel map from a user of the cable receiver device, updates the channel map based on the changes to the channel map from the user, and uploads the channel map to the electronic program guide service provider.

20 Claims, 2 Drawing Sheets

ACQUIRING CABLE CHANNEL MAP INFORMATION IN A CABLE RECEIVER

BACKGROUND

A set-top box is a device that connects to a television and an external signal source, turning the signals into content that displays on the television. The signal source includes Ethernet cable, satellite dish, coaxial cable, telephone line, broadband over power line, VHF or UHF antenna, or the like. Content includes any or all of video, audio, Internet webpages, interactive games, or the like. A set-top box, also known as a cable receiver when configured specifically for cable, or as a home media center when configured specifically for home media purposes, may be implemented as a standalone product or as an integrated part of a complete television.

Digital cable receivers receive digital television (DTV) broadcasts and content and may optionally receive analog television broadcasts for display on television sets that do not have a compatible built in digital tuner. For direct broadcast satellite systems, the set-top box is an integrated receiver/decoder (IRD). Some digital set-top boxes also have a built in digital video recorder (DVR) with a user interface for scheduling and recording content to an internal hard drive or data storage device. The user interface is typically an electronic program guide (EPG) that allows the viewer to schedule broadcast television or radio programs, with functions to navigate, select, and discover content by time, title, channel, genre, or the like, by the use of a remote control, keyboard, or other input devices such as a phone keypad. The EPG allows the viewer to see what is currently being shown on the channels that the set-top box receives.

The cable receiver utilizes a channel map, or virtual channel map, to relate or associate the physical channels in the RF spectrum to the actual TV channels, digital radio broadcasts, or other services. When the cable receiver includes a CableCARD, as defined by the CableLabs OpenCable™ specification, that is installed and functioning properly, the cable receiver connects to cable provider data feed(s) to obtain both the cable channel map and authorizations for the subscribed services. The channel map enables tuning as well as the link needed for the EPG to map its guide data to the actual physical channels. For non-OpenCable™ receivers or OpenCable™ receivers not equipped with a CableCARD, this channel lineup information that maps physical channels in the RF spectrum to video services and virtual channels is typically not published, and since the channel map changes by geographical region, the cable receiver vendor cannot pre-configure the cable receiver with a complete channel map. A complete setup of such a cable receiver involves significant consumer assistance to map the channels to the EPG.

Thus, there is a demand for a method for acquiring a channel map in a device such as a cable receiver, set-top box, home media center, or the like. The presently disclosed invention satisfies this demand.

SUMMARY

Aspects of the present invention provide a method, system, and computer program product for acquiring a channel map in a cable receiver. In one embodiment, the channel map associates physical analog and digital channels in an RF spectrum to channel identification data, where the channel identification data includes physical RF channel numbers, modulation type, virtual channels, and channel names. The method obtains a list of available channels from an electronic program guide service provider, and initializes the channel map based on the list of available channels. The method performs a channel scan to detect clear channels, and collect identification information for each detected clear channel. Based on the identification information, the method updates the channel map for each detected channel. The method receives changes to the channel map from a user of the cable receiver device, updates the channel map based on the changes to the channel map from the user, and uploads the channel map to the electronic program guide service provider.

In another embodiment, the channel map is based on identification information obtained from a channel scan to detect clear channels for a user, and changes to the channel map from the user. After the user uploads the channel map to an electronic program guide service provider, the method receives a message from the electronic program guide service provider. The message indicates that at least one other user, who shares a common or proximate location with the user, updated the channel map that the user uploaded to the electronic program guide service provider. The method updates the channel map based on the changes to the channel map from the at least one other user.

DETAILED DESCRIPTION

Figure 1:
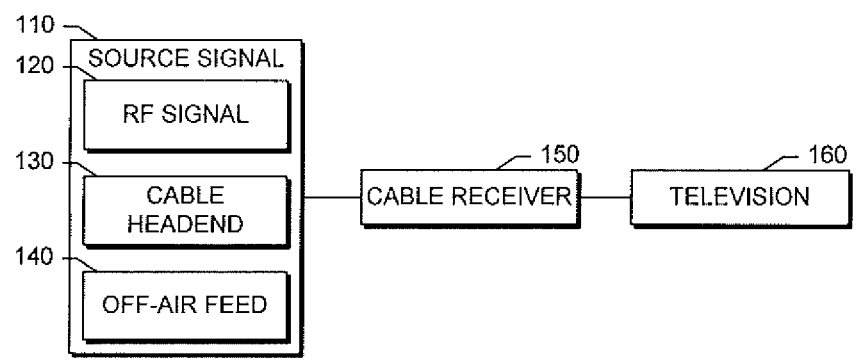
FIG. 1 is block diagram that illustrates one embodiment of the hardware components of a system that performs the present invention.

FIG. 1 is block diagram that illustrates one embodiment of the hardware components of a system that performs the present invention. As shown in FIG. 1, a cable receiver 150 connects to an external source signal 110 and a television 160. The cable receiver 150 receives the external source signal 110 from at least one of a radio-frequency (RF) signal 120, cable headend 130 feed, off-air feed 140, or the like. The cable receiver 150 is configured to convert the external source signal 110 to a digital audio/video stream that the television 160 receives and displays on a screen. In another embodiment, the television 160 integrates the functions performed by the cable receiver 150.

Figure 2:
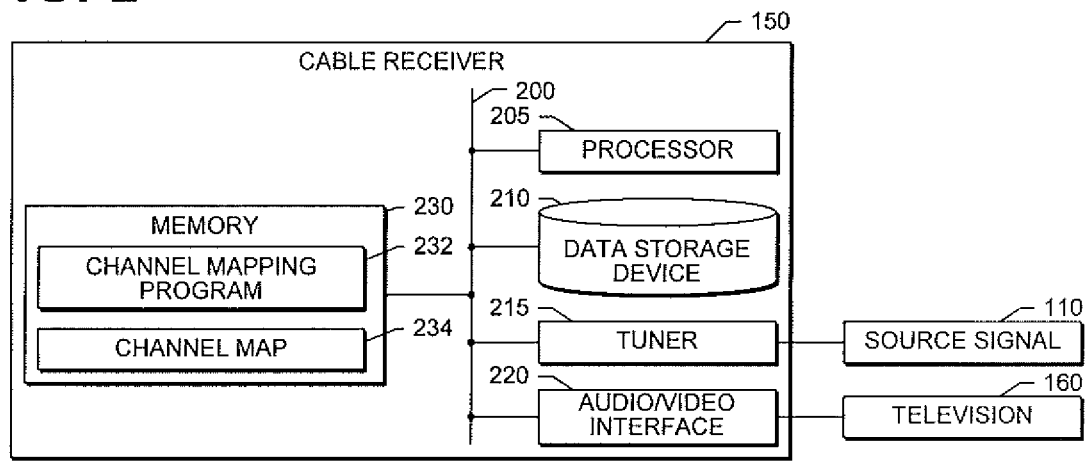
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the cable receiver 150.

The cable receiver 150 shown in FIG. 2 is a general-purpose computer that performs the present invention. A bus 200 is a communication medium that connects a processor 205, data storage device 210 (such as a disk drive, flash drive, flash memory, or the like), tuner 215, audio/video interface 220, and memory 230. The tuner 215 allows for reception of a broadcast signal from the source signal 110. In one embodiment, the tuner 215 is one or more RF tuners that receives off-air analog (e.g., 54 and 864 MHz, or the like), off-air digital (e.g., Advanced Television Systems Committee (ATSC) digital television (DTV), or the like), cable analog (e.g. National Television System Committee (NTSC), or the like), and/or cable digital (e.g., 64 QAM/256 QAM, or the like) signals. In various embodiments, the tuner 215 in the cable receiver 150 is a single simple tuner that receives one signal type, a single flexible tuner that receives multiple signal types, two or more simple tuners where each tuner receives a different signal type, or two or more flexible tuners where each tuner is able to receive multiple signal types. In another embodiment, the tuner 215 receives an Internet Protocol (IP) signal through Ethernet, Wireless Fidelity (WiFi), or the like. The audio/video interface 220 transmits and receives the messages and data that comprise a compressed audio/video stream to the television 160. In various embodiments, the compressed audio/video stream includes standard definition (SD), enhanced definition (ED), and high definition (HD) MPEG-2 video with output scaled to 480i, 480p, 720p, or 1080i, or the like. In another embodiment, the audio/video stream includes digital radio music channels that transmit an audio stream and may include an associated video image such as album cover art, song title, track information, artist information, and publisher information.

In one embodiment, the cable receiver 150 includes a digital video recorder (DVR). To support this additional functionality, the cable receiver 150 will include hardware and software to support the functions performed by the DVR, such as dual-tuners, dual-channel filters, interactive applications, watch-and-record functionality, home media server functionality, and the like.

The processor 205 performs the disclosed methods by executing the sequences of operational instructions that comprise each computer program resident in, or operative on, the memory 230. The reader should understand that the memory 230 may include operating system, administrative, and database programs that support the programs disclosed in this application. In one embodiment, the configuration of the memory 230 of the cable receiver 150 includes a channel mapping program 232, and a channel map 234. The channel mapping program 232 and channel map 234 perform the method of the present invention disclosed in detail in FIG. 3. These computer programs store intermediate results in the memory 230, or data storage device 210. In another embodiment, the memory 230 may swap these programs, or portions thereof, in and out of the memory 230 as needed, and thus may include fewer than all of these programs at any one time.

Figure 3:
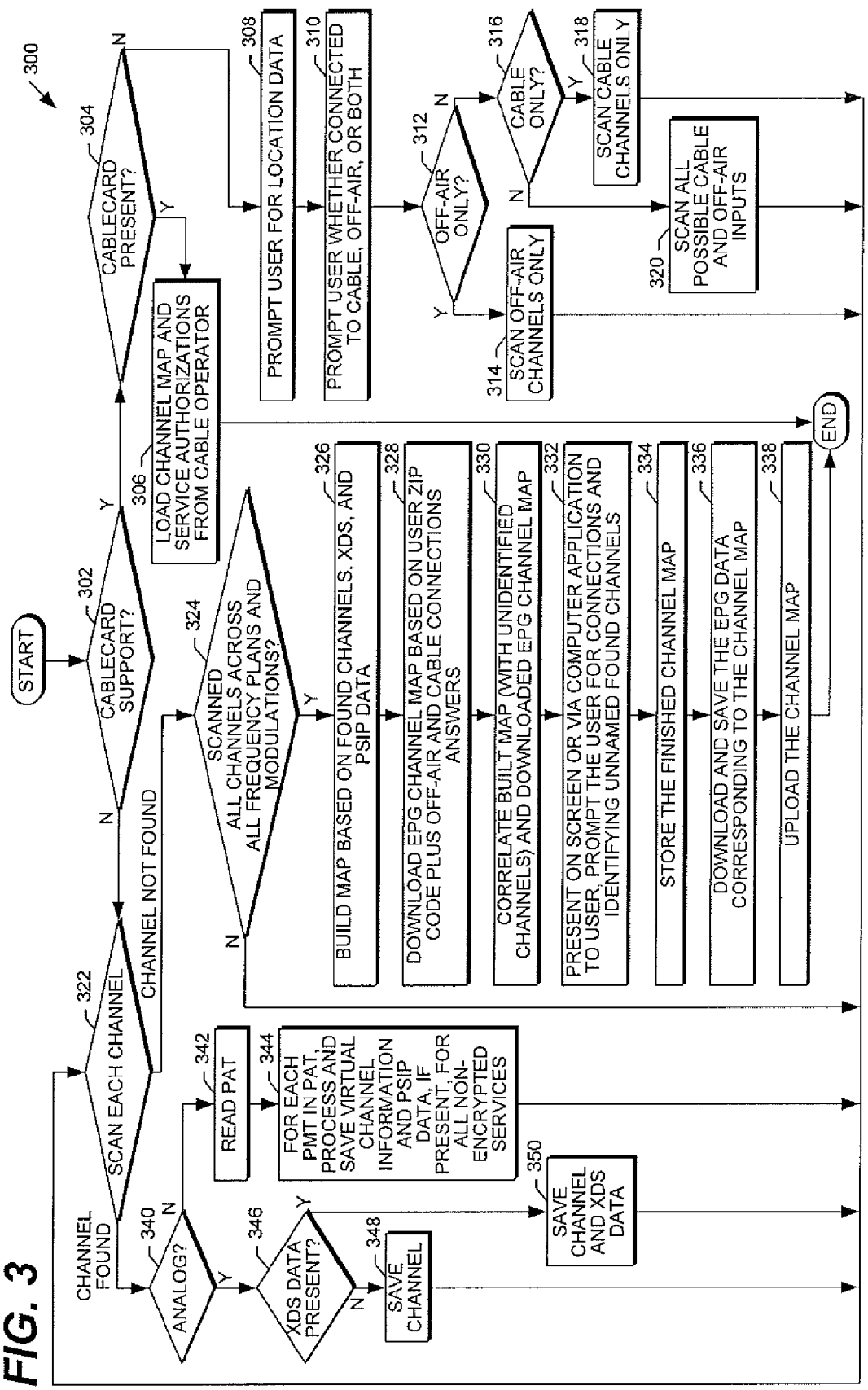
FIG. 3 is a flow chart that illustrates a method for acquiring a channel map in a computing device according to an embodiment of the present invention.

FIG. 3 is a flow chart that illustrates a method for acquiring a channel map in a computing device according to an embodiment of the present invention. With reference to FIG. 1 and FIG. 2, the process 300 shown in FIG. 3 begins by determining whether the cable receiver 150 provides CableCARD support (step 302). If the cable receiver 150 provides CableCARD support (step 302, Y branch), and the CableCARD is present (step 304, Y branch), the process 300 loads the channel map 234 and service authorizations from the cable operator (step 306), and the process 300 ends. In one embodiment, the process 300 obtains the EPG data from the cable operator directly while in another embodiment, it may be provided from another vendor/website such as TV Guide, or the like.

If the cable receiver 150 provides CableCARD support (step 302, Y branch), and the CableCARD is not present (step 304, N branch), the process 300 prompts the user to enter location data for the cable receiver 150 (step 308), such as the postal address, or ZIP code for the user, and prompts the user to determine whether the cable receiver 150 is connected to cable, off-air, or both (step 310). If the cable receiver 150 is connected to off-air channels only (step 312, Y branch), the process 300 scans the off-air channels (step 314), then proceeds to scan the channels (step 322). If the cable receiver 150 is not connected to off-air channels only (step 312, N branch), and is connected to cable channels only (step 316, Y branch), the process 300 scans the cable channels (step 318), then proceeds to scan the channels (step 322). If the cable receiver 150 is not connected to off-air channels only (step 312, N branch, and is not connected to cable channels only (step 316, N branch), the process 300 scans all possible cable and off-air inputs (step 320), then proceeds to scan the channels (step 322).

In one embodiment, when scanning the off-air channels (step 314), the process 300 assigns the tuner 215 to off-air input and scans off-air channels 2 through 69, but skipping any channels already scanned during signal detection for which no signal was found. The process 300 at each channel being scanned, searches for NTSC or 8-VSB (Vestigal SideBand) demod lock. Upon 8-VSB demod lock, the process 300 filters pertinent SI tables, such as PAT, PMT, PSIP, VCT, or the like. The data gleaned from the scan includes PSIP as defined by the Advanced Television System Committee (ATSC) standard A/65, channel name, service description, which physical channel in the RF spectrum received this channel, and the like. The process 300 stores the SI table information and the acquired physical channel frequency and modulation mode, along with its corresponding Advanced Television Systems Committee (ATSC) physical channel number in non-volatile memory, and stores newly scanned off-air channel information with the flexibility to support either variant of off-air scan. One variant is called New Scan in which any preceding channel scan information is erased by newly scanned channel information. The other variant is called Add Channel in which any old channels found in the new scan are not erased by newly scanned channel information, which is useful for when an antenna needs to be pointed in two directions to get all of the channels. In another embodiment, analog NTSC services may include Electronic Industries Alliance (EIA608) extended data services (XDS), such as cable ready televisions that identify the channel name and/or current program on analog channels (and digital channels with PSIP), that identify the programmer for incorporation in the channel map 234.

If the cable receiver 150 does not provide CableCARD support (step 302, N branch), the process 300 begins scanning the channels (step 322). For each channel scanned (step 322), if the channel is found (step 322, CHANNEL FOUND branch), if the channel is analog (step 340, Y branch), and if XDS data is present (step 346, Y branch), the process 300 saves the channel and XDS data (step 350). Otherwise, if XDS data is not present (step 346, N branch), the process 300 saves the channel (step 348). If the channel is not analog (step 340, N branch), the process 300 reads the PAT (step 342) and, for each PMT in the PAT, processes and saves virtual channel information and PSIP data, if present, for all non-encrypted services (step 344).

In another embodiment, when scanning the clear cable channels (step 330), the process 300 assigns the tuner 215 to the cable input and scans channels 2 through 135, interleaving IRD channels 1, 5, and 6, but skipping any standard incrementally related carrier (STD/IRC) channels already scanned during signal detection for which no signal was found. At each channel being scanned, the process 300 searches for demod lock on QAM64, and if unsuccessful, on QAM256. Upon demod lock, the process 300 filters for the program association table (PAT). For each program identified in the PAT, the process 300 attempts to filter pertinent system information (SI) tables, such as program map table (PMT), conditional access table (CAT) to determine if the channel is encrypted or in the clear. Where the CAT does not exist (clear channel), the process 300 attempts to filter the program and system information protocol (PSIP), virtual channel table (VCT), and the like. The data gleaned from the scan includes PSIP as defined by the Advanced Television System Committee (ATSC) standard A/65, channel name, genre, digital service description, virtual channels, the physical channel in the RF spectrum that received this channel, and the like. The process 300 stores the SI table information and the acquired physical channel frequency and modulation mode, along with its corresponding STD/IRC physical channel number in non-volatile memory. In parallel, and in one embodiment using separate hardware, the process 300 searches for National Television System Committee (NTSC) vertical presentation (VPRES). Upon VPRES detection, the process 300 stores the frequency of the acquired physical channel frequency, along with its corresponding STD/IRC physical channel number in non-volatile memory. If no STD/IRC channels are found, the process 300 scans harmonically related content (HRC) channels 1 to 135, but skipping any HRC channels already scanned during signal detection for which no signal was found. The process 300 conducts the same clear digital and analog channel detection and SI storage described for the STD/IRC channels.

For each channel scanned (step 322), if the channel is not found (step 322, CHANNEL NOT FOUND branch), and all channels across all frequency plans and modulations have not been scanned (step 324, N branch), the process 300 scans the next channel (step 322). When all channels across all frequency plans and modulations have been scanned (step 324, Y branch), the process 300 begins building the channel map 234 based on the channels found, and the XDS and PSIP data (step 326). The process 300 downloads the EPG channel map based on the user entered location data plus the off-air and cable connections answers (step 328), and correlates the built map (with the unidentified channels) and downloaded EPG channel map (step 330). The process 300 then presents the built channel map 234 on the television 160 screen, or via a computer application, to the user, and prompts the user for connections and identifying unnamed found channels (step 332). The process 300 stores the finished channel map 234 (step 334), downloads and saves the EPG data corresponding to the channel map 234 (step 336), uploads the saved channel map 234 (step 338), and ends.

In one embodiment, when the process 300 downloads the EPG channel map (step 328) includes saved EPG data (step 336) that was uploaded (step 338) by another user having the same location data. The process 300 assists the consumer in filling in the channel map 234 by overlaying a translucent list of the unassigned channel names that were downloaded while allowing the user to channel up through the currently unidentified channels found during the scan. For each unidentified channel, the process 300 highlights the channel name in the list. When the user selects the unidentified channel, they may associate that channel name with a currently tuned service. At this point, this channel would be removed from the unidentified list such that the channels left to assign is a continually decreasing list with decreasing tune options. The process 300 will also include an editable complete channel map list as well that will allow the user to fix any errors (e.g., incorrect assignments, assign favorites, or delete channels they aren't interested in accessing) in the channel map 234.

In another embodiment, the process 300 performs automatic processing of the data transmitted on either the clear cable channel or off-air channel to analyze the data and glean additional information. In one embodiment, the process 300 analyzes the actual picture, via digital signal processing (DSP), to extract a logo "bug" frequently placed at the lower right corner of the screen, to identify the programmer. This "bug" is typically persistent except during commercials, and the DSP analysis may extract the "bug" and using optical character recognition render it to a text field or perform an internet lookup to identify the particular channel. In another embodiment, the process 300 analyzes the soundtrack or closed captioning data to try to detect a station identifier.

The process 300 automatically (and transparently to the consumer) uploads the channel map 234 to the central database with the consumer/user location information and configuration data (cable/off-air). In another embodiment, to upload the channel map 234 for other consumers/users to access (step 338), the process 300 provides an interface for the consumer/user to login to a centralized database, and upload the channel map 234. The uploaded channel map 234 is stored with the location data of the consumer/user, such as postal address, or ZIP code for the consumer/user, whether the consumer/user subscribes to cable, the level of cable service, and off-air services. In one embodiment, when a future consumer/user purchases a cable receiver 150, the uploaded channel map 234 is provided as the initial EPG for the consumer/user if the consumer/user is from the same or a nearby location thereby saving significant consumer/user effort.

For example, the process 300 may correlate that a channel was found, the RF carrier was identified as cable channel 74, and the PSIP data identifies the channel as WPVI. Correlating this scanned channel information to the TV Guide will identify WPVI as the ABC affiliate in the Philadelphia area. When the consumer/user uploads this channel map, a future consumer/user from the Philadelphia area will receive a channel map that identifies that WPVI as being carried on cable channel 74.

Although the disclosed embodiments describe a fully functioning method for acquiring a channel map in a cable receiver, the reader should understand that other equivalent embodiments exist. Since numerous modifications and variations will occur to those reviewing this disclosure, the method for acquiring a channel map in a cable receiver is not limited to the exact construction and operation illustrated and disclosed. Accordingly, this disclosure intends all suitable modifications and equivalents to fall within the scope of the claims.

I claim:

1. A method for acquiring, in a cable receiver that connects to a cable provider for receiving channels in an RF spectrum, a channel map that associates each of a plurality of physical channels in the RF spectrum to corresponding channel identification data comprising a physical RF channel frequency, a modulation type, a virtual channel number, and a channel name, the method comprising:
    obtaining a list of available channels from an electronic program guide service provider different from the cable provider;
    initializing the channel map based on the list of available channels;
    performing a channel scan to detect non-encrypted channels, and collect identification information for each detected non-encrypted channel;
    updating the channel map based on the identification information for each detected non-encrypted channel;
    receiving changes to the channel map from a user of the cable receiver;
    updating the channel map based on the changes to the channel map from the user; and
    uploading the channel map to the electronic program guide service provider.

2. The method of claim 1, wherein the obtaining of the list of available channels further comprises:
    sending location data associated with a user of the cable receiver; and
    receiving the list of available channels for the location data.

3. The method of claim 1, wherein, when cable channels are detected, the performing of the channel scan further comprises:
  scanning the cable channels to detect non-encrypted cable channels for which a signal was found; and
  obtaining channel identification data for each non-encrypted cable channel.

4. The method of claim 1, wherein, when off-air channels are detected, the performing of the channel scan further comprises:
  scanning the off-air channels to detect non-encrypted off-air channels for which a signal was found; and
  obtaining channel identification data for each non-encrypted off-air channel.

5. The method of claim 1, wherein the receiving of changes to the channel map from the user further comprises:
  displaying information from the channel map to the user; and
  receiving a change request to the channel map from the user, the change request including channel identification data for an entry in the channel map.

6. The method of claim 1, wherein the uploaded channel map is the list of available channels for a subsequent user, when the subsequent user and the user share a common or proximate location.

7. The method of claim 1, further comprising:
  performing digital signal processing to extract a channel identifier from a picture, soundtrack, or closed caption data for each detected encrypted channel.

8. A system for acquiring, in a cable receiver that is configured to connect to a cable provider for receiving channels in an RF spectrum, a channel map that associates each of a plurality of physical channels in the RF spectrum to corresponding channel identification data comprising a physical RF channel frequency, a modulation type, a virtual channel number, and a channel name, the system comprising:
  a memory device resident in the cable receiver; and
  a processor disposed in communication with the memory device, the processor configured to:
    obtain a list of available channels from an electronic program guide service provider different from the cable provider;
    initialize the channel map based on the list of available channels;
    perform a channel scan to detect non-encrypted channels, and collect identification information for each detected non-encrypted channel;
    update the channel map based on the identification information for each detected non-encrypted channel;
    receive changes to the channel map from a user of the cable receiver;
    update the channel map based on the changes to the channel map from the user; and
    upload the channel map to the electronic program guide service provider.

9. The system of claim 8, wherein to obtain the list of available channels, the processor is further configured to:
  send location data associated with a user of the cable receiver; and
  receive the list of available channels for the location data.

10. The system of claim 8, wherein, when cable channels are detected, to perform the channel scan, the processor is further configured to:
  scan the cable channels to detect non-encrypted cable channels for which a signal was found; and
  obtain channel identification data for each non-encrypted cable channel.

11. The system of claim 8, wherein, when off-air channels are detected, to perform the channel scan, the processor is further configured to:
  scan the off-air channels to detect non-encrypted off-air channels for which a signal was found; and
  obtain channel identification data for each non-encrypted off-air channel.

12. The system of claim 8, wherein to receive changes to the channel map from the user, the processor is further configured to:
  display information from the channel map to the user; and
  receive a change request to the channel map from the user, the change request including channel identification data for an entry in the channel map.

13. The system of claim 8, wherein the processor is further configured to:
  perform digital signal processing to extract a channel identifier from a picture, soundtrack, or closed caption data for each detected non-encrypted channel.

14. A non-transitory computer-readable medium containing stored instructions for acquiring, in a cable receiver configured to connect to a cable provider for receiving channels in an RF spectrum, a channel map that associates each of a plurality of physical channels in the RF spectrum to corresponding channel identification data comprising a physical RF channel frequency, a modulation type, a virtual channel number, and a channel name, wherein the instructions, when executed by a processor of the cable receiver, cause the processor to perform a method comprising:
  obtaining a list of available channels from an electronic program guide service provider different from the cable provider;
  initializing the channel map based on the list of available channels;
  performing a channel scan to detect non-encrypted channels, and collect identification information for each detected non-encrypted channel;
  updating the channel map based on the identification information for each detected non-encrypted channel;
  receiving changes to the channel map from a user of the cable receiver;
  updating the channel map based on the changes to the channel map from the user; and
  uploading the channel map to the electronic program guide service provider.

15. The computer-readable medium of claim 14, wherein the obtaining of the list of available channels further comprises:
  sending location data associated with a user of the cable receiver; and
  receiving the list of available channels for the location data.

16. The computer-readable medium of claim 14, wherein, when cable channels are detected, the performing of the channel scan further comprises:
  scanning the cable channels to detect non-encrypted cable channels for which a signal was found; and
  obtaining channel identification data for each non-encrypted cable channel.

17. The computer-readable medium of claim 14, wherein, when off-air channels are detected, the performing of the channel scan further comprises:
  scanning the off-air channels to detect non-encrypted off-air channels for which a signal was found; and
  obtaining channel identification data for each non-encrypted off-air channel.

18. The computer-readable medium of claim 14, wherein the receiving of changes to the channel map from the user further comprises:
displaying information from the channel map to the user; and
receiving a change request to the channel map from the user, the change request including channel identification data for an entry in the channel map.

19. The computer-readable medium of claim 14, further comprising:
performing digital signal processing to extract a channel identifier from a picture, soundtrack, or closed caption data for each detected non-encrypted channel.

20. A method for acquiring, in a cable receiver device comprising a processor and configured to connect to a cable provider for receiving channels in an RF spectrum, a channel map that associates each of a plurality of physical channels in the RF spectrum to corresponding channel identification data comprising a physical RF channel frequency, a modulation type, a virtual channel number, and a channel name, the method comprising:
storing, in a memory of the cable receiver device, the channel map comprising channel identification data obtained from a channel scan to detect non-encrypted channels; and
if a change request for the channel map is received from a user of the cable receiver device:
updating the channel map based upon the change request;
uploading the channel map to an electronic program guide service provider different from the cable provider;
receiving, in the cable receiver device, a message from the electronic program guide service provider, the message indicating that at least one other user, who shares a common or proximate location with the user, updated the channel map that the user uploaded to the electronic program guide service provider; and
updating, in the cable receiver device, the channel map based on the changes to the channel map from said at least one other user.

* * * * *